United States Patent Office 3,017,339
Patented Jan. 16, 1962

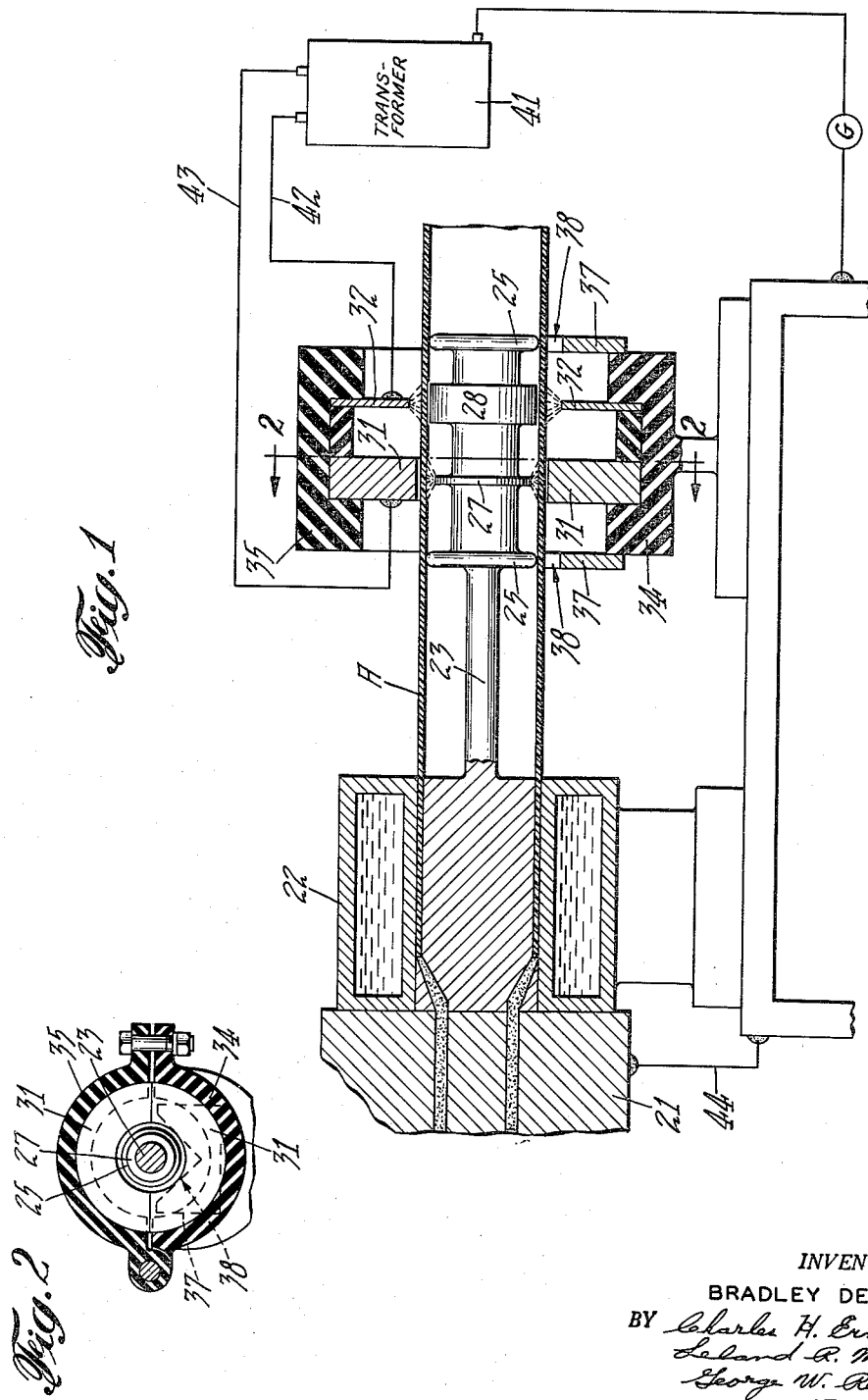
Jan. 16, 1962
B. DEWEY
3,017,339
METHOD OF AND APPARATUS FOR TREATING SURFACES
OF EXTRUDED THERMOPLASTIC TUBING
WITH CORONA DISCHARGE
Filed Jan. 24, 1957
INVENTOR.
BRADLEY DEWEY
BY Charles H. Erne
Leland R. McCann
George W. Reiber
ATTORNEYS

3,017,339
METHOD OF AND APPARATUS FOR TREATING SURFACES OF EXTRUDED THERMOPLASTIC TUBING WITH CORONA DISCHARGE
Bradley Dewey, Cambridge, Mass., assignor, by mesne assignments, to American Can Company, New York, N.Y., a corporation of New Jersey
Filed Jan. 24, 1957, Ser. No. 636,021
5 Claims. (Cl. 204—165)

The present invention relates to the surface treatment of thermoplastic tubing for the reception of protective and decorative coatings, printing inks, adhesives and the like in a manner which causes them to readily and firmly adhere thereto, and has particular reference to a method of and apparatus for improving the adherence characteristics of exterior and interior surfaces of polyethylene or the like thermoplastic tubing by the application of a high voltage electrical stress accompanied by corona discharge as the tubing is extruded in substantially continuous lengths.

In the manufacture of squeeze-to-use packages, such as tubes, bottles and cans made from polyethylene and the like thermoplastic tubing for drugs, cosmetics and household specialties, it has been found that the interior and exterior surfaces of the tubing due to their paraffin-like characteristics presents a problem in the proper adhesion of protective and decorative coatings.

An object of the instant invention is to render the inner and outer surfaces of thermoplastic tubing receptive to protective and decorative coatings to a degree where these coatings will readily and firmly adhere to the surfaces permanently.

Another object is to provide such a surface treatment which has a long lasting effect so that coating of the surfaces may be effected subsequently when convenient.

Another object is to provide for independent treatment of the interior or exterior surfaces of such tubing or for the simultaneous treatment of both surfaces.

Another object is to provide for treating the surfaces of the tubing as the tubing is extruded in substantially continuous lengths.

Another object is to effect such surface treatment of tubing by subjecting its surface or surfaces to a high voltage electric stress accompanied by a corona discharge through the use of concentric electrodes between which the tubing is passed.

Numerous other objects and advantages of the invention will be apparent as it is better understood from the following description, which, taken in connection with the accompanying drawings, discloses a preferred embodiment thereof.

Referring to the drawings:

FIGURE 1 is a longitudinal sectional view of one form of apparatus embodying the instant invention and used for effecting the method steps of the invention; and FIG. 2 is a reduced scale transverse sectional view taken substantially along the line 2—2 in FIG. 1.

As a preferred or exemplary embodiment of the instant method and apparatus invention, the drawings disclose the steps of and apparatus for extruding a substantially continuous length of polyethylene or other thermoplastic material tubing A and as the tubing is extruded, guiding and passing it axially between concentric electrodes, preferably stationary electrodes, one of which is arranged interiorly of and coaxially with the tubing and the other of which surrounds and is arranged coaxially of both the tubing and the internal electrode with at least one of the electrodes spaced substantially equidistantly from a surface of the tubing to create an annular air gap of uniform dimension radially therebetween and causing an electrical corona discharge between the electrodes.

While specific reference has been made to polyethylene the instant invention is readily applicable to other thermoplastic materials such as polyamides, polyesters, vinyl polymers and copolymers, polymers of vinylidene chloride, polystyrene, and polypropylene and its copolymers.

In the method steps of the instant invention it is contemplated to treat both inner and outer surfaces of the tubing either simultaneously or individually as required. Where both surfaces are to be treated simultaneously two sets of concentric electrodes preferably are provided although one set alone may be used satisfactorily and where one surface is to be treated individually only one set of concentric electrodes preferably is provided. The tubing is extruded through conventional hot and cold dies and immediately it is passed between the concentric electrodes. A continuous charge of high voltage electric current is fed to one of the electrodes of each set. The opposite electrode of each set is grounded to the machine. This electric charge is sufficient to create a corona discharge in the air gap between the concentric electrodes of each set. It has been found preferably for best results to provide a greater air gap adjacent the surface to be treated than adjacent the opposite surface so as to produce a corona discharge adjacent the surface to be treated. Air gaps of from .020" to .040" adjacent the surface to be treated and clearance air gaps adjacent the opposite surface have been found satisfactory. Hence the corona discharge is concentrated adjacent the surface to be treated although some treatment of the opposite surface is also obtained.

Thus when it is desired to treat the inner surface of the moving tubing, an inner electrode of proper dimensions is provided to produce an air gap preferably of between .020" and .040" between the electrode and the inner surface of the tubing and a clearance air gap is provided between the outer surface of the tubing and the outer surrounding electrode. Hence the corona discharge between the electrodes is concentrated adjacent the inner surface of the tubing and it is this surface that is fully treated.

In a similar manner where it is desired to treat the outer surface of the moving tubing, an inner electrode of proper dimensions is provided to produce a clearance air gap between the inner electrode and the inner surface of the tubing and an air gap preferably of between .020" and .040" is provided between the outer surface of the tubing and the outer surrounding electrode. Hence the corona discharge between the electrodes is concentrated adjacent the outer surface of the tubing and it is this outer surface that is fully treated.

Where both surfaces of the tubing are to be treated, one set of electrodes may be used with substantially equal air gaps adjacent both surfaces to satisfactorily treat these surfaces but it is preferred that two sets of electrodes be used, one set being dimensioned to provide a greater air gap adjacent the inner surface as explained above and the second set being dimensioned to provide a greater air gap adjacent the outer surface as also explained above. Thus both surfaces are fully treated as the tubing passes the two sets of electrodes.

During this movement of the tubing past the electrodes it is maintained in concentricity with the electrodes by being guided, preferably interiorly, so that at least one or the other of the inner or outer electrodes is spaced at a substantially constant and uniform distance radially from one of the surfaces of the tubing, namely the surface to be treated.

The drawings illustrate one form of apparatus for carrying out the steps of the above disclosed method invention. In such an apparatus, the substantially continuous length of thermoplastic tubing preferably is extruded in the usual manner by conventional hot and cold dies 21, 22 (FIG. 1) which form parts of a conventional tube extruding machine such as those well known in the art. The tubing as it is extruded from the dies 21, 22 passes axially over a mandrel or horn 23 which is disposed coaxially with and extends endwise from the cold die 22 as shown in FIG. 1.

The advancing tubing A is supported concentric with the horn 23 by a pair of spaced and parallel cylindrical tube supports or guides 25 which are disposed immediately adjacent but in spaced relation to the cold die 22. These guides 25 are formed with an outer diameter substantially equal to the inside diameter of the tubing so that the tubing readily passes over them and is guided along an axial path of travel.

Treatment of the inner and/or outer surfaces of the tubing is effected while it passes over the guides 25. For this purpose the horn 23 carries a pair of spaced and parallel cylindrical inner electrodes 27, 28 which are located between and in spaced relation to the guides 25 and are coaxial with the horn 23 and the guides 25.

Electrode 27 cooperates with an outer ring shaped electrode 31 which is concentric with the inner electrode 27 and which surrounds the inner electrode and the guided tubing A for the purpose of treating the inner surface of the tubing. In order to provide the proper air gap between the tubing and the electrodes, the inner electrode 27 is formed with an outside diameter of a dimension which results in a space of between .020" and .040" entirely around the electrode between the outer periphery of the electrode and the inner surface of the tubing A. In a similar manner the inside diameter of the outer or ring electrode 31 is made slightly greater than the outside diameter of the tubing to provide the proper outside clearance air gap. The inner electrode 27 preferably is relatively narrow in the manner of a disc while the outer electrode 31 preferably is considerably wider to spread the corona discharge effect and thus results in a surface treatment equal to that produced by multiple electrodes of narrower width. The inner and outer electrodes 27, 31 constitute one set of electrodes and these electrodes are utilized for the treatment of the inner surface of the tubing.

A second set of two concentric electrodes located coaxially with the horn 23 are utilized to treat the outer surface of the tubing. One of these electrodes is the inner electrode 28 which is carried on the horn 23. This electrode preferably is a wide cylindrical electrode like the outer electrode 31 and is formed with an outside diameter slightly smaller than the inside diameter of the tubing so as to provide the proper clearance air gap between the outer periphery of the electrode and the inner surface of the tubing. This wide inner electrode 28 cooperates with a concentrically located outer or ring shaped narrow electrode 32 which is similar to the inner electrode 27. This outer electrode 32 is formed with an inside diameter preferably from .020" to .040" greater than the outside diameter of the tubing so as to provide the proper air space for the treatment of the outer surface of the tubing.

The two outer ring electrodes 31, 32 preferably are diametrically split members (see FIG. 2) so as to be hinged or swung out of the way of the tubing to facilitate establishment of the tubing when starting the extruding operation. These split outer electrodes 31, 32 are carried in and insulated from split housings 34, 35 which surround the path of travel of the tubing and preferably are hinged together to facilitate opening as above explained. The hinge pin of the housings is carried in the frame of the apparatus. The outer electrodes 31, 32 are also insulated from each other and are removable for the purpose of removing one of the electrodes to leave the other in place for treatment of the inner or the outer surface of the tubing individually. Outside guide members or plates 37 secured to the ends of the lower half of the housing 34 are provided to guide the tubing on the outside if neecssary. These plates 37 are provided with V-shaped notches 38 (FIG. 2), the edges of which serve as guides for the outer surface of the tubing.

The corona discharge between the inner and outer electrodes of each set is effected by a high voltage electric current sufficient to produce the corona preferably of between 10,000 and 15,000 volts, transmitted from a transformer 41 by lead wires 42, 43 connected to the outer ring electrodes 31, 32. To complete the circuit, the inner electrodes 27, 28 are grounded to the extruder and the extruder preferably is connected by a ground wire 44 to the outer electrode support frame of the apparatus to insure safety and proper operation.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. An apparatus for treating the surfaces of thermoplastic tubing for the reception of a surface coating, comprising two electrode sets each including a pair of spaced concentric electrodes, means for passing between the electrodes of each set a high voltage electric current accompanied by corona discharge, and means for passing said tubing between the electrodes of each set with one of the electrodes of each set located internally of and coaxial with said tubing and the other electrode of the same set surrounding said tubing and the corresponding internal electrode, a small radially uniform space being provided between the inside surface of said tubing and the internal electrode of one set and a similar small radially uniform space being provided between the outside surface of said tubing and the surrounding electrode of the other set for treating opposed surfaces of said tube simultaneously, and wherein said surrounding electrodes are removable individually to render one set of electrodes inoperable for the treatment of a selected surface individually by the other set of electrodes.

2. A method of treating the surfaces of thermoplastic tubing for the reception of a surface coating, comprising advancing a continuous length of tubing along a path of travel, maintaining the tube fully expanded for at least a portion of its path of travel, passing the wall of the expanded portion of the tubing continuously between a pair of concentrically spaced electrodes one of which is arranged internally of the tubing and the other externally thereof with both electrodes arranged to nearly fit the tubing size and shape, so guiding the tubing as to be spaced a small but substantially constant and uniform distance radially from the surface of at least one of said electrodes, and impressing a high value alternating voltage across the space between said electrodes at values to produce a corona discharge.

3. A method of the character defined in claim 2 wherein the tubing is guided in spaced relation to the surface of the internally arranged electrode for treating the internal surface of the tubing.

4. A method of the character defined in claim 2 wherein the tubing is guided in spaced relation to the surface of the externally arranged electrode for treating the external surface of the tubing.

5. A method of the character set forth in claim 2 wherein there are provided two sets of concentric electrodes one set spaced along the path of tubing travel from the other and wherein the tubing in fully expanded condition is passed through both sets, and wherein the tubing is guided in spaced relation to the surface of the internally arranged electrode at one set of electrodes and in spaced relation to the surface of the externally arranged electrode at the other set for treating each surface of the tubing in turn as the tubing progresses.

References Cited in the file of this patent

UNITED STATES PATENTS

| | | |
|---|---|---|
| 2,261,847 | Dufour et al. | Nov. 4, 1941 |
| 2,280,771 | Dufour et al. | Apr. 28, 1942 |
| 2,770,841 | Cooke et al. | Nov. 20, 1956 |
| 2,802,085 | Rothacker | Aug. 6, 1957 |

FOREIGN PATENTS

| | | |
|---|---|---|
| 715,914 | Great Britain | Sept. 22, 1954 |
| 722,875 | Great Britain | Feb. 2, 1955 |